United States Patent
Roberts et al.

(10) Patent No.: US 7,738,548 B2
(45) Date of Patent: Jun. 15, 2010

(54) SYSTEM AND METHOD FOR COMMUNICATING AT LOW SIGNAL-TO-NOISE RATIO USING INJECTED TRAINING SYMBOLS

(75) Inventors: Richard D. Roberts, Hillsboro, OR (US); Terry Tabor, Oviedo, FL (US)

(73) Assignee: Harris Corporation, Melbourne, FL (US)

( * ) Notice: Subject to any disclaimer, the term of this patent is extended or adjusted under 35 U.S.C. 154(b) by 772 days.

(21) Appl. No.: 11/620,893

(22) Filed: Jan. 8, 2007

(65) Prior Publication Data

US 2008/0165039 A1    Jul. 10, 2008

(51) Int. Cl.
*H03K 5/159* (2006.01)
(52) U.S. Cl. .................................................. 375/233
(58) Field of Classification Search ................ 375/233, 375/257, 219, 150, 343; 370/208, 210, 350; 341/102
See application file for complete search history.

(56) References Cited

U.S. PATENT DOCUMENTS

| 4,365,338 A | 12/1982 | McRae et al. .................. 375/12 |
| 5,127,051 A * | 6/1992 | Chan et al. .................... 375/348 |
| 6,862,324 B1 | 3/2005 | Lui et al. ...................... 375/326 |
| 6,925,108 B1 | 8/2005 | Miller et al. ................. 375/150 |
| 7,010,020 B2 | 3/2006 | Bultan et al. ................. 375/148 |
| 7,151,792 B2 * | 12/2006 | Shimizu et al. ............. 375/148 |
| 2001/0014114 A1 | 8/2001 | Baltersee et al. ............ 375/148 |
| 2002/0118635 A1 * | 8/2002 | Nee ........................... 370/210 |

* cited by examiner

*Primary Examiner*—Khai Tran
(74) *Attorney, Agent, or Firm*—Allen, Dyer, Doppelt, Milbrath & Gilchrist, P.A.

(57) ABSTRACT

A system and method for communicating includes a transmitter that transmits a communication signal having a plurality of successive frames, with each frame formed with alternatively arranged N known data symbols and M unknown data symbols such that the N known data symbols as training symbols. The communications signals are received within a receiver. The N known data symbols are synchronized at the receiver by correlating and time averaging the N known data symbols.

34 Claims, 5 Drawing Sheets

SYSTEM AND METHOD FOR COMMUNICATING AT LOW SIGNAL-TO-NOISE RATIO USING INJECTED TRAINING SYMBOLS

FIELD OF THE INVENTION

The present invention relates to the field of communications, and more particularly, to digital communication systems that use training symbols.

BACKGROUND OF THE INVENTION

Many RF communication systems introduce distortion into messages transmitted over the communications link and make it difficult to reproduce the original message at the receiver. This distortion can result from multipath reception, group delay distortion, noise amplitude distortion, interference, dispersive facing or the time-spread of the time response. As a result, many communication systems introduce an anti-distortion compensation scheme at the receiver.

Adaptive equalizers, i.e., recursive filters, are often used. In these systems, the characteristics of the channel are estimated, and the data subjected to a pre-distortion filter function based on the observed influence of the channel on the communications signals as they are received. Some systems adapt to the distortion introduced into the data and rely on unknown signal inputs. Other systems provide adaptive equalization to compensate time spread and frequency spread distortion. For example, a known signal is interleaved with segments of the original message at the transmitter to create alternating bursts of unknown data in a known signal spaced apart in time and transmitted to the receiver. Instead of using a time domain equalization approach, the distortion compensation equipment converts the received message signal and a known test signal into the frequency domain for processing to obtain an estimate of the transfer function of the communication link that is used to recreate the originally transmitted message signal. There is some delay factor involved in this type of system.

The use of adaptive equalizers is routine and usually (a) train-off the data, for example, a decision feedback equalizer, (b) train-off a prescribed preamble such as an IEEE 802.11 packet based systems, or (c) train-off embedded ambles contained within the data, such as used in cellular radio and in disclosed commonly assigned U.S. Pat. No. 4,365,338, the disclosure which is hereby incorporated by reference in its entirety.

In the incorporated by reference '338 patent, the signal transmission and data recovery devices use a selected transmission scenario and adaptive filtering process in which the transmitted message is assembled to contain alternately arranged known and unknown pluralities of data symbols. At the transmitter, the known data symbols are generated by a sequence generator, with an identical generator provided at the receiver for reproducing the known symbol sequences and enabling data recovery. At the receiver, a prescribed data recovery algorithm containing a transversal filter function and a data estimate refinement is applied to the communications signal. The algorithm uses a priori knowledge of data symbols of those portions of the transmitted message between which unknown data symbols are located. The transmitted message typically contains a plurality of successive frames, with each frame containing N known data symbols operative as training symbols, followed by M unknown data symbols or vice versa. Synchronization of the local pseudo noise (PN) sequence generator with the PN sequence of which the successive sets of N known data symbols are composed is achieved by using a prescribed tone sequence/initialization scheme.

The use of the powerful forward error correction codes in this type of modern digital transmission systems described above makes training any adaptive equalizer such as disclosed in the incorporated by reference '338 patent difficult at low signal/noise (Eb/No) ratio since the forward error correction (FEC) code exhibits a lower Eb/No performance threshold than the equalizer. Thus, it is desirable to improve the channel estimator performance and improve the signal-to-noise ratio performance of the equalizer training algorithm to an arbitrary low Eb/No value, including a value that is lower in value than the FEC code threshold.

SUMMARY OF THE INVENTION

A system and method for communicating includes a transmitter that transmits a communications signal having a plurality of successive frames, with each frame formed with alternatively arranged N known data symbols and M unknown data symbols such that the N known data symbols as training symbols enable the characteristics of a transversal filter function and data estimates of the unknown symbols to be updated and adaptively refined. The communication signals are received within a receiver. The N known data symbols are synchronized at the receiver by correlating and time averaging the N known data symbols.

The maximal length PN sequence generator at the transmitter produces the known data symbols. A maximal length PN sequence generator at the receiver reproduces the known symbol sequences to enable data recovery. In one aspect, the data symbols used for each insertion of the known symbols may or may not be identical for each insertion.

The receiver can apply a prescribed data recovery algorithm containing a transversal filter function and data estimate refinement scheme that takes advantage of the a priori knowledge of data symbols of those portions of the transmitted message between which unknown data symbols are located. A correlation synchronization search can occur to synchronize the local PN sequence generator at the receiver with the PN sequence of which the successive sets of N known data symbols are composed of the transmitted message such that multiple correlation search results are combined and averaged.

In one aspect, a correlator and averaging circuit correlates and time averages the N known data symbols to form differently timed cross-correlation products. The correlator and averaging circuit can be formed as lag time, on-time, and lead time correlators. The N known data symbols can be the same or different within successive frames. The receiver can comprise a transversal filter circuit that subjects the communication signal to a transversal filter function and data estimate process.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

In accordance with a non-limiting example of the present invention, multiple training ambles as injected training symbols undergo correlation and averaging to improve the channel estimation performance. By observing the ambles or symbols over multiple ambles and time averaging, it is possible to improve the signal-to-noise ratio performance of the equalizer training algorithm to an arbitrary low Eb/No value that is lower than the forward error correction (FEC) code threshold, and thus, improve the training threshold. The Eb/No ratio can be considered to be the energy per bit per noise power spectral density and defining the SNR per bit.

In accordance with another non-limiting example of the present invention, a processor at the receiver is operative as an acquisition averaging sliding correlator that averages multiple correlation products to improve the equalizer training threshold. This system and method can add value to any communications system that benefits from operation at a very low Eb/No and improve operation in terms of bit error rate (BER) and availability. The system also allows communications to occur where otherwise communications may not be possible. The synchronization tracking algorithm could be based upon a modified correlation based "late-gate, early-gate" algorithm.

Figure 1:
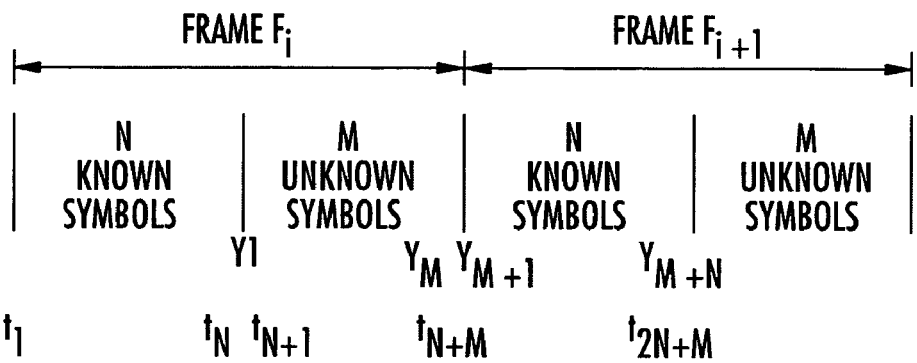
FIG. 1 is a fragmentary diagram showing successive data frames, each having N known symbols and M unknown symbols that could be used in accordance with a non-limiting example of the present invention.

FIG. 1 illustrates the format of a communications signal as a message that is transmitted in accordance with a system and method as disclosed in commonly assigned and incorporated by reference U.S. Pat. No. 4,365,338 to McRae et al. This type of signal is processed by the correlation processor, in accordance with the present invention, as described below. The message includes a series of frames, with each frame containing N known data symbols as training symbols followed by M unknown data symbols or vice versa. The data could be assumed to be encoded in binary format with N known symbols of a frame corresponding to data bits that form part of a pseudo noise (PN) sequence. The M unknown data symbols of a frame constitute the digital representations of the actual information signals of interest to be decoded at the receiver. The M unknown data symbols can be generated by a commercially available voice digitizer device, such as a CVSD, as a non-limiting example. Thus, for any frame Fi, the transmitted message can be formatted to contain N known digital PN symbols $\tau_1$-$\tau_N$, followed by M unknown digital voice symbols $\tau_{N+1} \ldots \tau_{N+M}$.

Characteristics of the "known symbol" sequence include a linear autocorrelation that is nearly an impulse at zero lag as a white sequence. The sequence is typically longer than the impulse response duration of the channel. The sequence should include a guard interval (GI) before and after the sequence to prevent inter-symbol interference (ISI) from other unknown data symbols.

In a communications system for transmitting information over a dispersive link, the transmitted message is assembled to contain alternately arranged known and unknown pluralities of data symbols as shown in FIG. 1. At the transmitter, the known data symbols may be produced by a maximal length PN sequence generator, with an identical generator provided at the receiver for reproducing the known symbol sequences to enable data recovery. At the receiver, the received message is subjected to a prescribed data recovery algorithm containing a transversal filter function and a data estimate refinement scheme, which takes advantage of the a priori knowledge of data symbols of those portions of the transmitted message between which unknown data symbols are located.

The transmitted message contains a plurality of successive frames with each frame containing N known data symbols followed by M unknown data symbols. Thus, preceding and succeeding each set of M unknown data symbols are respective sets of N known data symbols that enable the characteristics of the transversal filter function, and thereby the data estimates of the unknown symbols, to be updated and adaptively refined.

The system and method, in accordance with non-limiting examples of the present invention, can use basic teachings in accordance with the system and method disclosed in the '338 patent with modifications as explained below. The data symbols, used for each insertion of the known symbols, may or may not be identical for each insertion, allowing a trade-off between complexity and probability of detection.

At the receiver, the received message is subjected to a prescribed data recovery algorithm containing a transversal filter function and a data estimate refinement scheme which takes advantage of the a priori knowledge of data symbols of those portions of the transmitted message between which unknown data symbols are located.

In accordance with a non-limiting example of the present invention, synchronization of the local PN sequence generator at the receiver with the PN sequence of which the successive sets of N known data symbols are composed in the transmitted message is achieved through a correlation synchronization search in which multiple correlation search results are combined and averaged to maximize the signal-to-noise ratio by averaging out the noise. It is typically assumed in the system that the channel characteristics remain stationary over the duration of this search averaging process.

There now follows a description relative to FIGS. 2-5 of the communications system disclosed in the incorporated by reference and commonly assigned U.S. Pat. No. 4,365,338, which processes the frame and symbol sequence shown as an example in FIG. 1. Basic components of that described system can be used with modification, in accordance with non-limiting examples of the present invention.

Figure 2:
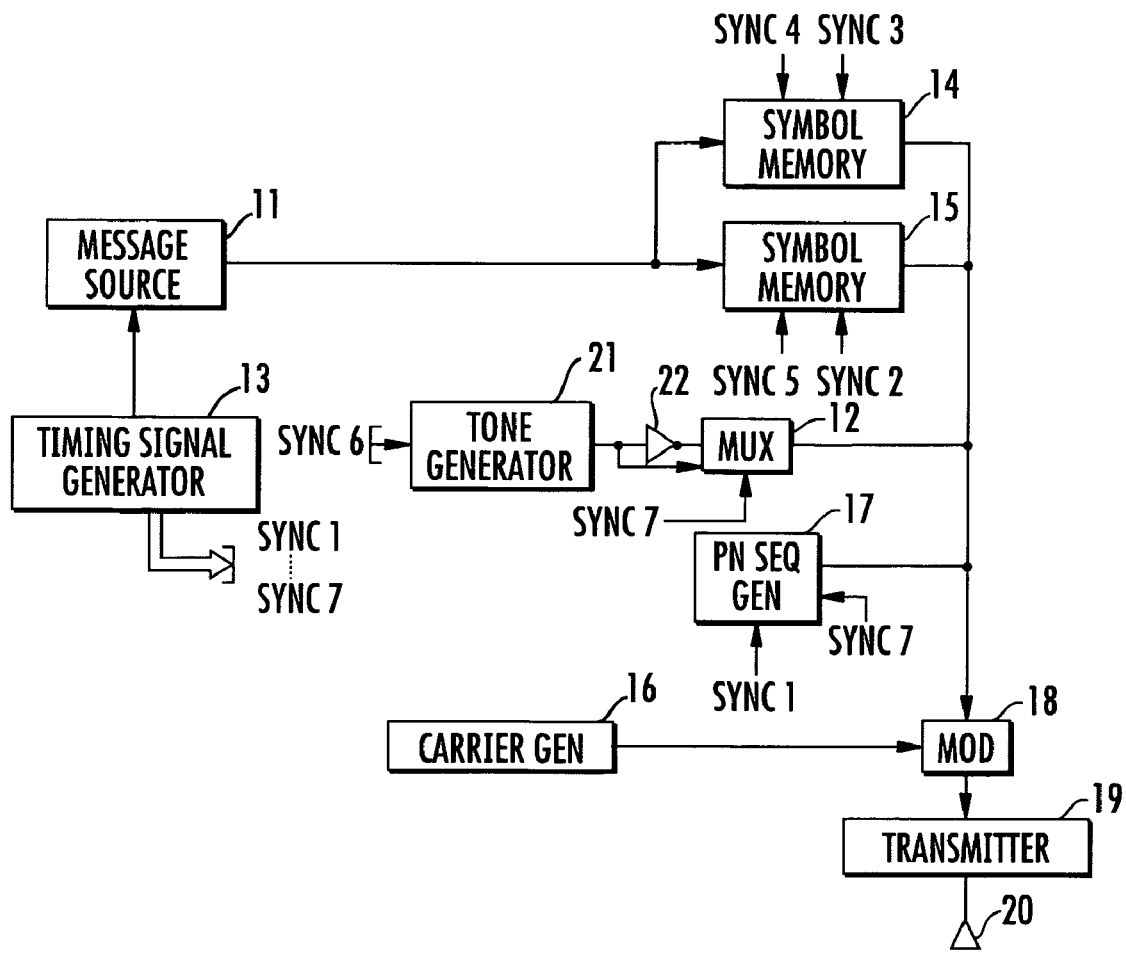
FIG. 2 is a block diagram of a prior art transmitter for assembling and transmitting the frames of data shown in FIG. 1.

FIG. 2 is a block diagram of one subpart of a transmitter that generates the frame sequence shown in FIG. 1 for transmission as a communications signal over an HF channel. A message source 11, such as a CVSD, supplies output signals, representative of the unknown information signals to be conveyed over the HF channel to a pair of random access symbol memories 14 and 15. Timing signals for the operation of the components of FIG. 1 are derived from a timing signal or synchronizing signal generator 13. Signal lines for these signals are identified by SYNC number designations SYNC 1-SYNC 7. These timing signals are coupled to symbol memories 14 and 15, a tone generator 21, multiplexer 12 and PN sequence generator 17.

The transmitter includes a carrier generator 16, which supplies a locally generated carrier signal to a modulator 18, the output of which feeds an RF transmitter 19 for transmission of the assembled information signals over the HF channel via antenna 20. The carrier-modulating input to the modulator 18 is derived from either RAM 14 or RAM 15 or from PN sequence generator 17.

The source 11 generates message information signals, and can comprise any message source (such as telephone signals) analog or digital, supplying information in the form of a varying electrical signal. In the case of an analog source, such as voice signals, a digitizing device such as a CVSD is incorporated as part of message source 11, so that its output is encoded in pulse format, preferably binary pulse format. A typical synchronization or timing signal sequence by which the transmitter of FIG. 2 operates is shown in FIG. 3.

Figure 3:
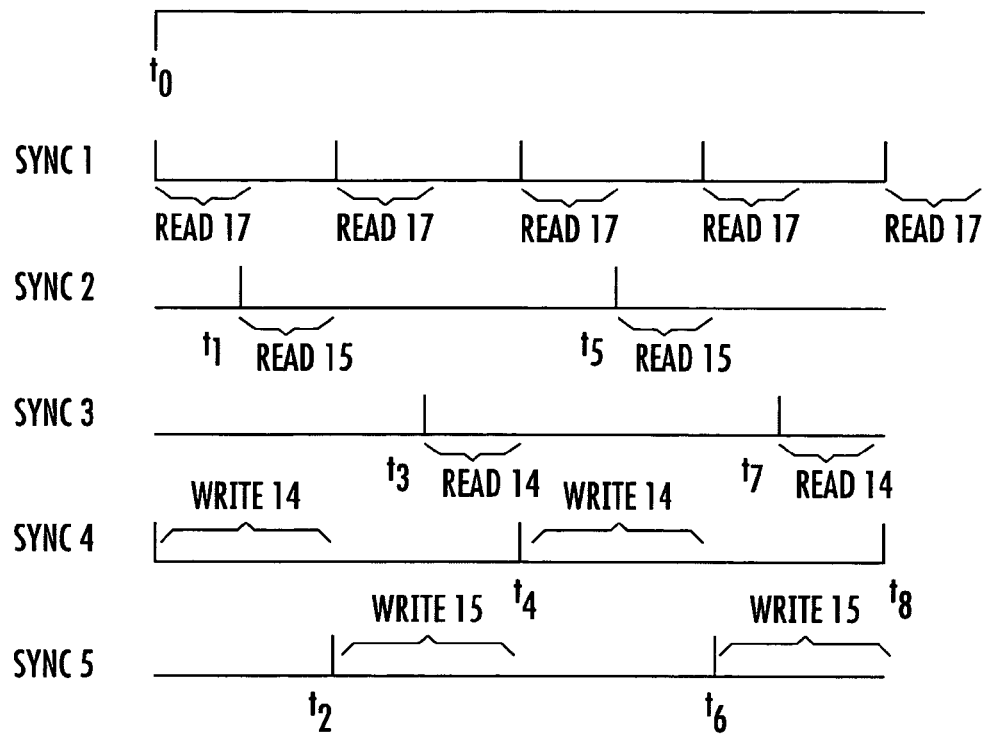
FIG. 3 is a timing diagram that explains the operation of the transmitter shown in FIG. 2.

The top line of FIG. 3 represents an uninterrupted digital message output of message source 11 beginning at time $t_0$. SYNC signal lines SYNC 1-SYNC 5 represent timing signal outputs applied to PN sequence generator 17 and RAMs 14 and 15 from generator 13 in order to generate the signal sequence shown in FIG. 1 to be applied to the modulator 18. Signal SYNC 1 is applied to PN sequence generator 17 to cause it to generate a known signal sequence during a first readout interval (identified as READ 17 corresponding to the reading out of signals from PN sequence generator 17). PN sequence generator 17 may be formed as a ROM that has been programmed to produce a maximal length PN sequence, the maximal length being considerably longer than the number of symbols per frame. Simultaneously with the reading out of a portion of the PN sequence generator by PN sequence generator 17, the data output of message source 11 is written into one of memories 14 and 15 depending upon which of signals SYNC 4 and SYNC 5 is generated at the time.

As shown in FIG. 3, at time $t_0$, SYNC 4 is generated simultaneously with SYNC 1, so that during time period $t_0$-$t_2$ the output of message source 11 is written into memory 14. Subsequently, at time $t_2$, the output of message source 11 is written into memory 15 as SYNC 5 is applied to the write enable input of memory 15 simultaneously with the generation of the next SYNC 1 signal. Through this alternate generation of timing signals SYNC 4 and SYNC 5, sequential portions of the output of message source 11 are alternately stored in memories 14 and 15.

To read out the contents of each memory and prepare them to receive and store new alternate sequential portions of the uninterrupted message, timing signal generator 13 produces read-out control signals SYNC 2 and SYNC 3. Upon the termination of the reading out of PN sequence generator 17 at time $t_1$, the timing signal generator 13 applies read enable signal SYNC 2 to memory 15 in order to read out the contents of memory 15 during the period of time between times $t_1$ and $t_2$. Subsequently, at time $t_3$, read-out signal SYNC 3 is applied to memory 14 to read-out the contents of memory 14.

Through this alternate writing and reading out of memories 14 and 15, the data contained in the uninterrupted message output of message source 11 is applied in an interleaved fashion with the output of PN sequence generator 17 to modulator 18. During read-out, the data in memories 14 and 15 is read out at a rate faster than the rate at which it is written into memory so that it is compressed relative to the rate at which it is stored. The data is written into memory 14 at a first relatively slow rate during the interval $t_0$-$t_2$ and read out at a relatively fast rate (compared to the storage rate) during a shorter time interval $t_3$-$t_4$. Similarly, data written into memory 15 during time interval $t_2$-$t_4$ is read out as a faster rate during time interval $t_5$-$t_6$. As the technique of data compression, per se, is conventional, no further description will be presented here. Thus, at the modulation input of modulator 18, the outputs of memories 14 and 15 and PN sequence generator 17 are combined under the control of SYNC signals SYNC 1-SYNC 5 to obtain the message sequence shown in FIG. 1. This signal is modulated onto the output of carrier generator 16 and transmitted over the HF channel to the receiving station. An additional pair of synchronization or timing signals SYNC 6 and SYNC 7 are produced by timing signal generator to control the format of the beginning of a message transmission. These timing signals are applied to a tone generator 21, the output of which is coupled directly, and inverted via inverter 22, to respective inputs of a multiplexer 12. The output of multiplexer 12 is coupled to modulator 18. Also, the SYNC 7 timing signal output of generator 13 is coupled to operate PN sequence generator 17 during a portion of the beginning of a transmission as will be explained subsequently.

Figure 4:
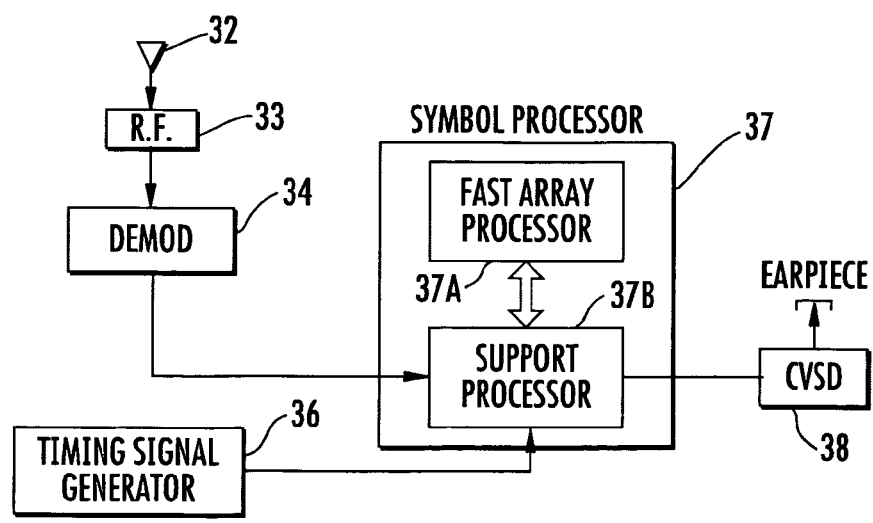
FIG. 4 is a block diagram of a prior art receiver that processes and recovers the successive frames of transmitted data shown in FIG. 1.

A block diagram of a receiver for processing a message as described relative to FIGS. 1-3 is shown in FIG. 4 and includes a radio frequency section 33 to which a received signal is coupled via antenna 32. The incoming carrier is stripped off in the RF section 33 and the resulting IF signal is applied to demodulator 34, the output of which is coupled to an adaptive recursive filter-simulating symbol processor 37. The output of demodulator 34 corresponds to the data originally applied to modulator 18 at the transmitter but subjected to the influence of the HF transmission channel, so that the signal values applied to processor 37 may not, and most likely will not, correspond to those transmitted by the transmitter. The receiver includes a timing signal or sync generator 36, having an output coupled to processor 37. The timing signal generator contains a stable clock source. As will be explained in particular detail below, processor 37 operates on the data produced by demodulator 34 in accordance with a data recovery algorithm that effectively simulates an adaptive transversal filter, the functional parameters of which are updated dynamically using the a priori knowledge of the known sets of symbols for adjacent signal frames, to predict the effect of the HF channel on the unknown data symbols. The output of processor 37 represents the recovered data absent the distortion caused by the dispersive HF channel. This output is coupled to an output message device, such as a CVSD 38, for example, to produce an analog signal corresponding to the original message (e.g., voice) input at the transmitter.

In the incorporated by reference '338 patent, the symbol processor 37 can include a pair of processor subsystems, illustrated in FIG. 4, as a fast array processor (FAP) 37A and a support processor (SUPP) 37B, which operate on the demodulated received signal symbols in accordance with a prescribed algorithm scenario and recover the original data. Within the support processor subsystem 37B configuration, a local PN sequence generator, identical to that employed in the transmitter, provides the successive groups of N known data symbols during the implementation of the data recovery algorithm through which successive frames of signals (consisting of N known and M unknown symbols each) are processed.

Figure 5:
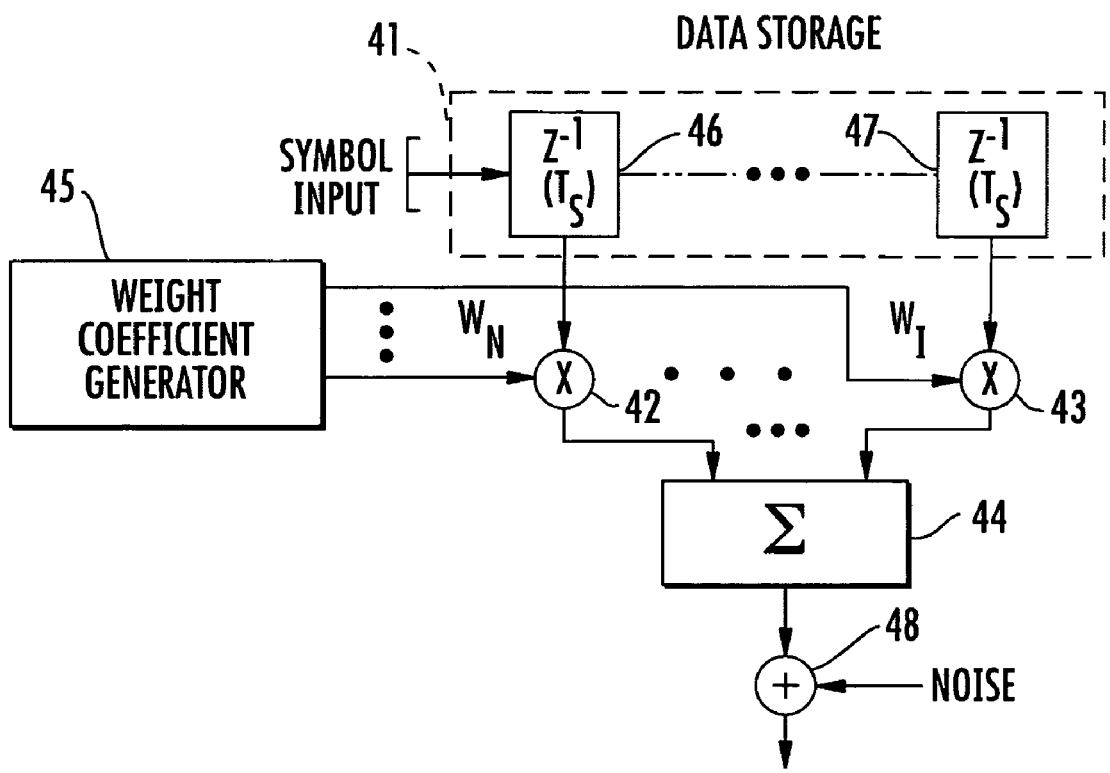
FIG. 5 is a block diagram of a prior art equalizer used for equalizing the symbols with an initialization sequence.

A frame of information that is assembled and transmitted from the transmitting station is formatted to contain N successive symbols as may be derived from a known symbol sequence (e.g., a PN code sequence) followed by M successive unknown data symbols. The successively sampled received values from the dynamic dispersive HF channel may be considered to have been generated by a transversal filter as illustrated in FIG. 5. The transversal filter includes a data storage register 41 of length N containing a plurality of storage stages $Z^{-1}$ (only the first stage 46 and the last stage 47 of which are shown in FIG. 5). Each stage stores a respective successive data symbol sample. The contents of each stage of data storage register 41 are coupled to a respective weight multiplier, only the first and last of which, 42 and 43, are shown. These multipliers multiply the contents of register 41 by weighting coefficients supplied from a weight coefficient generator 45. The outputs of multipliers 42 ... 43 are summed in an adder 44 to produce a data symbol. Weighting coefficient generator 45 operates in accordance with a prescribed measurement/evaluation function and selectively modifies or updates the weight multiplier values supplied to the weight coefficient multipliers 42 ... 43 in order to simulate the distortion-introducing characteristics of the channel.

Further details of the transversal filter function are disclosed in the incorporated by reference '338 patent. Also, the decisions for unknown transmitted values can be iterated to determine "end values" as set forth in the '338 patent. Channel weights can be determined and satisfied by re-estimating the channel weights for each frame of data. The channel weights for each frame of data can be re-estimated based upon the decisions and the estimated weights of a previous frame. In order for the receiver to implement the decision algorithm, it is provided with knowledge of the M known symbols transmitted during each frame through the use of a local PN generator within the processor that produces the same PN sequence transmitted for each frame of data.

In order that the receiver's PN sequence generator produces the PN sequence in synchronism with the PN sequence that was transmitted, it is necessary to transmit the synchronization code or signal sequence that is recognized by the receiver as the start of a transmission and through which the receiver turns on its PN generator so that it will be in synchronism with the incoming data. This can be established by the training sequence, which contains the signal that it can be recognized as a start signal for the local PN generator. In more high data rate modems, a burst carrier can be followed by a phase reversal. The phase reversal system uses a single tone for synchronization and it is also possible that two or more tones are used where the frequency of spectral fades into the channel, and cause identification of a single tone to be unreliable.

Thus, the training sequence can be formed as two or more tones lasting for a predetermined time, such as one second, followed by a phase reversal for a fraction of a second, followed by several seconds of known data. Detection circuitry can recognize the presence of one of those tones and detect the occurrence of the phase reversal. As noted before, the receiver is synchronized with the framing sequence contained in a message and a training mode for establishing weighting coefficients.

This system, as disclosed in the '338 patent, allows channel distortion compensation and data recovery by taking advantage of the separability of variable speed signal processing techniques to implement an adaptive filtering process to handle high rate data.

In accordance with a non-limiting example of the present invention, the drawbacks associated when the communications link has low Eb/No because the FEC code exhibits a lower Eb/No performance threshold than the equalizer is overcome by "training-off" the embedded ambles as the training symbols contained within the data and undergoing correlation and averaging to improve the channel estimator performance. Thus, by observing the ambles, over multiple ambles, and time averaging, the signal-to-noise ratio performance of the equalizer training algorithm is improved for an arbitrary low Eb/No value, including a value that is lower than the FEC code threshold.

Figure 6:
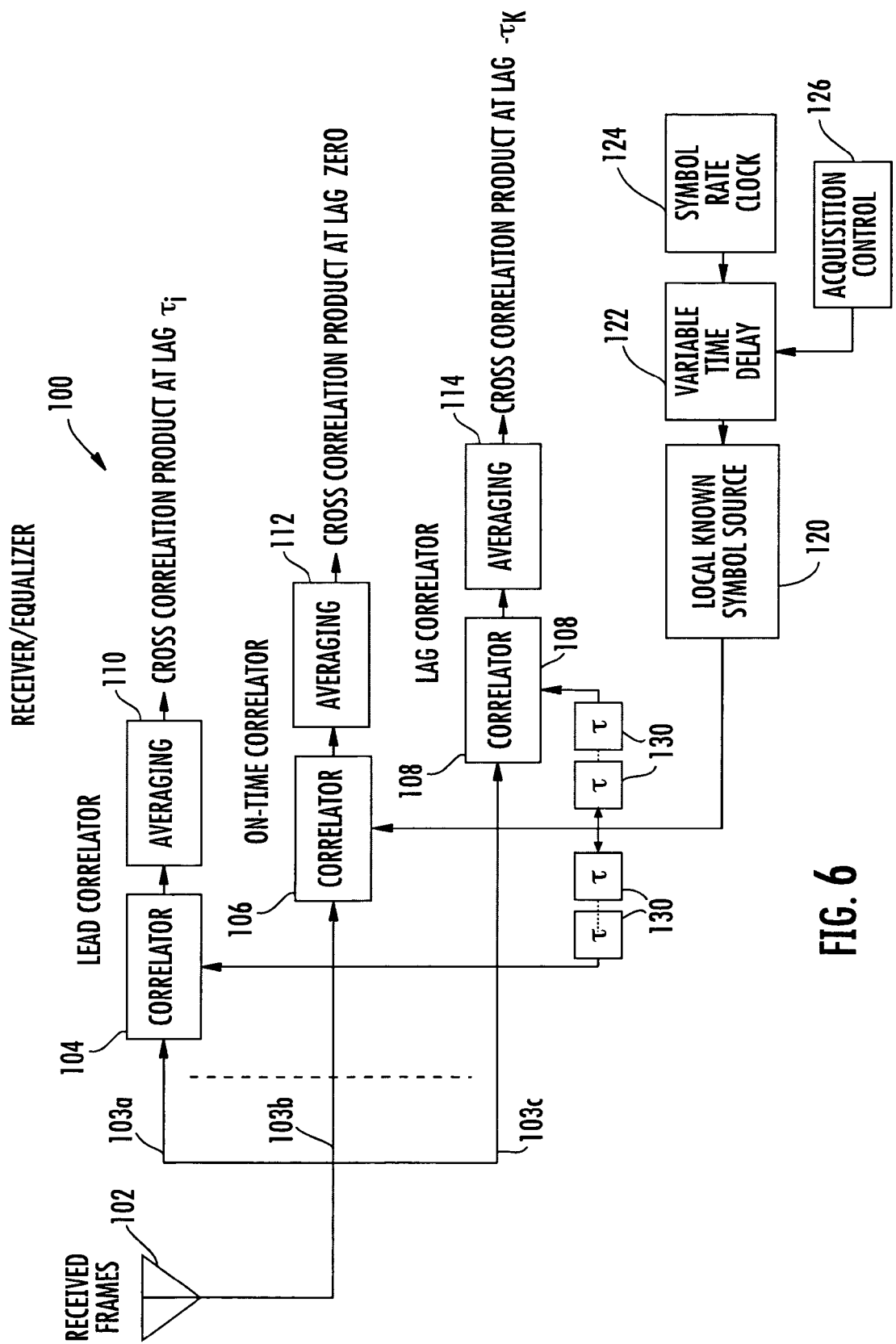
FIG. 6 is a block diagram of a portion of a receiver/equalizer circuit used for correlating and time averaging in accordance with a non-limiting example of the present invention.

In the system shown in FIG. 6, the local PN sequence generator at the receiver is synchronized with the PN sequence of which the successive sets of N known data symbols are composed in the transmitted message through a correlation synchronization search. Multiple correlation search results are combined and averaged to maximize the signal-to-noise ratio by averaging out the noise.

In FIG. 6, an acquisition averaging sliding correlator processor as part of a receiver/equalizer circuit, in accordance with a non-limiting example of the present invention, is illustrated at 100. It should be understood that the circuit components as described can be implemented in software, hardware, firmware and other techniques known to those skilled in the art. This circuit equalizes digital transmissions at a low Eb/No using injected training symbols such as in a communications signal as described before relative to FIGS. 1-5. Received frames are received at an antenna 102 and split into three channels 103a, 103b and 103c, each channel having correlator circuits 104, 106 and 108, identified as a lead correlator circuit 104 at the top of first channel 103a, an on-time correlator circuit 106 in the middle channel 103b, and a lag correlator circuit 108 at the bottom or third channel 103c. Of courser different numbers of channels and correlators can be used, and the description is for example purposes. Each correlator circuit includes a respective series connected averaging circuit 110, 112 and 114 as illustrated. The output of the averaging circuit 110 connected to the lead correlator 104 forms a cross-correlation product at lag $\tau_i$. The on-time correlator 106 and averaging circuit 112 outputs a cross-correlation product at lag "0." The lag correlator 108 and averaging circuit 114 output a cross-correlation product at lag $-\tau_k$. Thus, the correlators form differently timed cross-correlation products.

Each correlator 104, 106 and 108 receives inputs from a local known symbol source 120, which in turn, is connected to a variable time delay circuit 122 and symbol rate clock circuit 124. The variable time delay circuit receives acquisition control signals from an acquisition control circuit 126. The correlator circuits receive $\tau$ references from $\tau$ (time) circuits 130 as illustrated.

In accordance with a non-limiting example of the present invention, multiple training sequences can be detected and averaged together, i.e., integrated and added together, to create artificially enough signal-to-noise ratio that the job of "training-up" the receiver can be accomplished. The training sequence is embedded periodically, and in accordance with a non-limiting example of the present invention, each training sequence can be used somewhat independently. During the acquisition process using the receiver/equalizer 100 shown in FIG. 6, it is possible to search for the proper clock phase. The clock can drift across the signal. This system is similar to a "late-gate, early-gate" algorithm, which can be applied in a modified manner to the process as described.

As shown by the receiver/equalizer circuit 100 in FIG. 6, it is possible to determine whether the system drifts to the right or left, and determine whether the clock should be adjusted to get back to where the system belongs. The maximum signal output typically is at the middle correlator, known as the on-time correlator. A lower signal output would be at the top and bottom correlators, i.e., the lead and lag correlators. If the system drifts in either direction by slowing down or speeding up on the clock, then the middle correlator will begin going down or up, and the signal will go into one of the other correlators, i.e., not both, but one or the other. By comparing the signal amplitude, it is possible to adjust the phase to the right or to the left to obtain the maximum output in the middle or on-time correlator 106 and minimum output in the other two correlators as the lead and lag correlators. Thus, the multiple correlation products can be averaged to improve equalizer training threshold.

It is also possible that the system could be applied to ultra-wideband signals, for example, as disclosed in U.S. Pat. No. 6,925,108. Once synchronization occurs and the receiver is locked, it is possible to despread the signal. It is possible to use a periodic amble as the same amble that is repeated over and over again. It is possible to correlate for and lock onto that signal. Thus, it becomes a repeating preamble, and thus, it is possible to distribute them throughout the data sequence.

Figure 7:
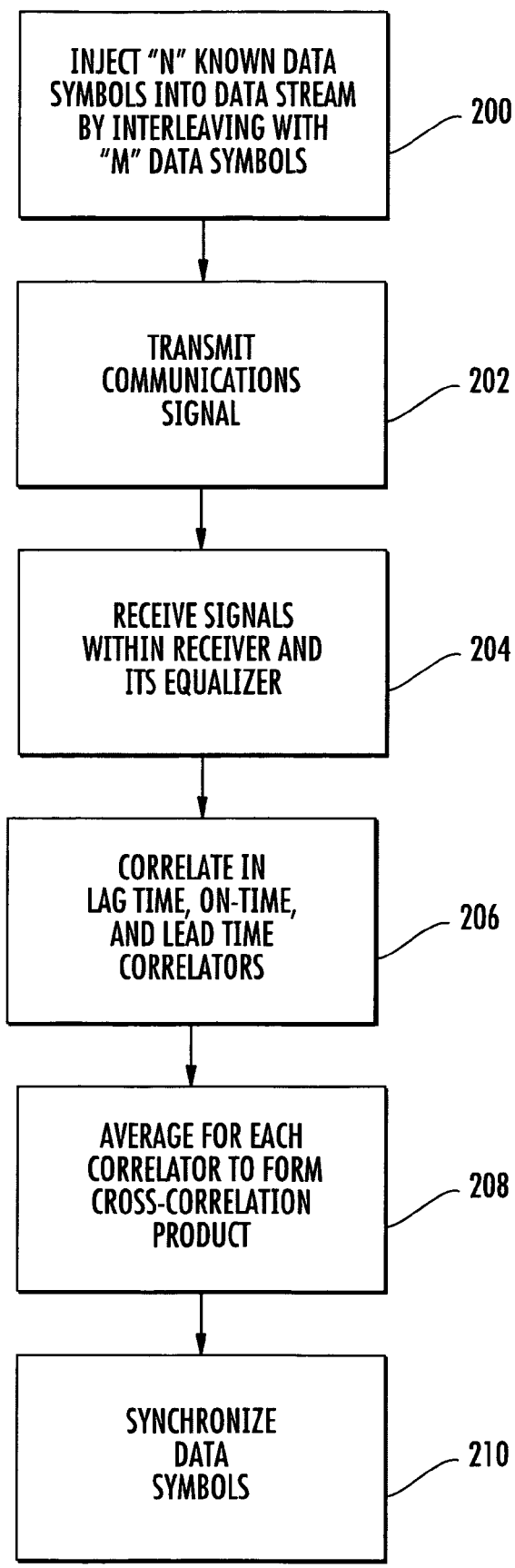
FIG. 7 is a high-level flowchart showing a basic method that can be used with the described communications system in accordance with a non-limiting example of the present invention.

FIG. 7 is a high-level flowchart illustrating a basic sequence of steps, in accordance with a non-limiting example of the present invention. At block 200, N known data symbols are injected into the data stream by interleaving with the M data symbols. The communications signal is transmitted (block 202) and received in a receiver/equalizer circuit (block 204). The communications signal is correlated in lag time, on-time, and lead time correlators (block 206). The signals from each of the correlators is averaged to form a cross-correlation product (block 208). The N known data symbols are then synchronized (block 210).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system, comprising:
    a transmitter for transmitting a communications signal having a plurality of successive frames with each frame comprising alternately arranged N known data symbols as training symbols and M unknown data symbols; and
    a receiver for receiving the communications signal and synchronizing the N known data symbols by correlating and time averaging the N known data symbols as multiple correlation search results that are combined and averaged to improve a training threshold.

2. The communications system according to claim 1, wherein said receiver further comprises a correlator and averaging circuit for correlating and time averaging the N known data symbols to form differently timed cross-correlation products.

3. The communications system according to claim 2, wherein said correlator and averaging circuit further comprises lag time, on-time and lead time correlators.

4. The communications system according to claim 1, wherein said transmitter further comprises a pseudo-noise (PN) sequence generator for generating the N known data symbols.

5. The communications system according to claim 4, wherein said receiver further comprises a pseudo-noise (PN) sequence generator that is substantially similar to the PN sequence generator at the transmitter.

6. The communications system according to claim 1, wherein the same N known data symbols are formed within successive frames.

7. The communications system according to claim 1, wherein different N known data symbols are formed within successive frames.

8. The communications system according to claim 1, wherein said receiver further comprises a transversal filter circuit that subjects the communications signal to a transversal filter function and data estimate process.

9. A method for communicating, comprising:
    transmitting a communications signal having a plurality of successive frames with each frame comprising alternately arranged N known data symbols as training symbols and M unknown data symbols;
    receiving the communications signal within a receiver; and
    synchronizing the N known data symbols at the receiver by correlating and time averaging the N known data symbols as multiple correlation search results that are combined and averaged to improve a training threshold.

10. The method according to claim 9, which further comprises averaging multiple correlation products at the receiver.

11. The method according to claim 10, which further comprises generating the N known data symbols using a pseudo-noise (PN) sequence generator.

12. The method according to claim 11, which further comprises reproducing known symbol sequences at a receiver using a pseudo-noise (PN) sequence generator that is substantially similar to the PN sequence generator that generates known data symbols for transmission.

13. The method according to claim 9, which further comprises forming the known data as symbols the symbols same within successive frames.

14. The method according to claim 9, which further comprises forming the known data symbols as different symbols within successive frames.

15. The method according to claim 9, which further comprises subjecting the communications signal at the receiver to a transversal filter function and data estimate process.

16. The method according to claim 15, which further comprises enabling the characteristics of the transversal filter function and data estimates of M unknown symbols by N known data symbols.

17. The method according to claim 9, which further comprises:
    conducting multiple correlation searches; and
    combining and averaging the correlation search results to maximize the signal-to-noise ratio.

18. A method for communicating, comprising:
    transmitting a communications signal having a plurality of successive frames with each frame comprising alternately arranged N known data symbols as training symbols and M unknown data symbols;
    receiving the communications signal at a receiver; and
    processing the communications signal by forming and averaging differently timed cross-correlation products as multiple correlation searches that are combined and averaged to improve a training threshold.

19. The method according to claim 18, which further comprises forming cross-correlation products by processing the communications signal within lag time, on-time time and lead time correlators.

20. The method according to claim 19, synchronizing the N known data symbols at the receiver by correlating and time averaging the N known data symbols.

21. The method according to claim 20, which further comprises averaging multiple correlation products at the receiver to form respective cross-correlation products.

22. The method according to claim 18, which further comprises generating the known data symbols using a pseudo-noise (PN) sequence generator.

23. The method according to claim 22, which further comprises reproducing known symbol sequences at a receiver using a pseudo-noise (PN) sequence generator that is substantially similar to the PN sequence generator that generates known data symbols for transmission.

24. The method according to claim 18, which further comprises forming the known data symbols as the same symbols within successive frames.

25. The method according to claim 18, which further comprises forming the known data symbols as different symbols within successive frames.

26. The method according to claim 18, which further comprises subjecting the communications signal at the receiver to a transversal filter function and data estimate process.

27. The method according to claim 26, which further comprises enabling the characteristics of the transversal filter function and data estimates of M unknown symbols by N known data symbols.

28. The method according to claim 18, which further comprises:
conducting multiple correlation searches; and
combining and averaging the correlation search results to maximize the signal-to-noise ratio.

29. A communications system, comprising:
a transmitter for transmitting a communications signal having a plurality of successive frames with each frame comprising alternately arranged N known data symbols as training symbols and M unknown data symbols; and
a receiver for receiving the communications signal and synchronizing the N known data symbols by correlating and time averaging the N known data symbols to improve a training threshold, wherein said receiver further comprises a correlator and averaging circuit for correlating and time averaging the N known data symbols to form differently timed cross-correlation products, and said correlator and averaging circuit further comprises lag time, on-time and lead time correlators.

30. A method for communicating, comprising:
transmitting a communications signal having a plurality of successive frames with each frame comprising alternately arranged N known data symbols as training symbols and M unknown data symbols;
receiving the communications signal within a receiver; and
synchronizing the N known data symbols at the receiver by correlating and time averaging the N known data symbols to improve a training threshold, and further comprising conducting multiple correlation searches and combining and averaging the correlation search results to maximize the signal-to-noise ratio.

31. A method for communicating, comprising:
transmitting a communications signal having a plurality of successive frames with each frame comprising alternately arranged N known data symbols as training symbols and M unknown data symbols;
receiving the communications signal at a receiver; and
processing the communications signal to form differently timed cross-correlation products to improve a training threshold, and forming cross-correlation products by processing the communications signal within lag time, on-time time and lead time correlators.

32. The method according to claim 31, synchronizing the N known data symbols at the receiver by correlating and time averaging the N known data symbols.

33. The method according to claim 32, which further comprises averaging multiple correlation products at the receiver to form respective cross-correlation products.

34. A method for communicating, comprising:
transmitting a communications signal having a plurality of successive frames with each frame comprising alternately arranged N known data symbols as training symbols and M unknown data symbols;
receiving the communications signal at a receiver;
processing the communications signal to form differently timed cross-correlation products to improve a training threshold;
conducting multiple correlation searches; and
combining and averaging the correlation search results to maximize the signal-to-noise ratio.

* * * * *